(12) United States Patent
Vogler et al.

(10) Patent No.: US 12,071,058 B2
(45) Date of Patent: Aug. 27, 2024

(54) FLOOR MAT WITH INTEGRAL GROMMET AND RETAINER

(71) Applicant: THERMOFLEX CORPORATION, Waukegan, IL (US)

(72) Inventors: Michael Vogler, Deerfield, IL (US); Robert Price, Mettawa, IL (US); Jacob Price, Waukegan, IL (US)

(73) Assignee: THERMOFLEX CORPORATION, Waukegan, IL (US)

( * ) Notice: Subject to any disclaimer, the term of this patent is extended or adjusted under 35 U.S.C. 154(b) by 0 days.

(21) Appl. No.: 17/938,026

(22) Filed: Oct. 4, 2022

(65) Prior Publication Data

US 2023/0045537 A1    Feb. 9, 2023

Related U.S. Application Data

(62) Division of application No. 17/393,336, filed on Aug. 3, 2021, now Pat. No. 11,554,705.

(51) Int. Cl.
*B60N 3/00*    (2006.01)
*B60N 3/04*    (2006.01)

(52) U.S. Cl.
CPC .................................. *B60N 3/046* (2013.01)

(58) Field of Classification Search
None
See application file for complete search history.

(56) References Cited

U.S. PATENT DOCUMENTS

| | | | | |
|---|---|---|---|---|
| 5,599,148 | A * | 2/1997 | Hirose | F16B 37/0842 411/338 |
| 5,775,859 | A * | 7/1998 | Anscher | F16B 5/065 411/509 |
| 8,757,698 | B1 * | 6/2014 | Rowland | B60N 3/044 296/97.23 |
| 10,723,252 | B2 | 7/2020 | Price et al. | |
| 2013/0287996 | A1 * | 10/2013 | Masanek, Jr. | F16B 2/20 403/338 |
| 2018/0065531 | A1 * | 3/2018 | Zhang | F16B 37/0857 |

FOREIGN PATENT DOCUMENTS

FR    2950295 A1 *   3/2011   ............. B60N 3/046

OTHER PUBLICATIONS

Translation of FR2950295 (Year: 2023).*

* cited by examiner

*Primary Examiner* — Alexander S Thomas
(74) *Attorney, Agent, or Firm* — Greer, Burns & Crain, Ltd (57) ABSTRACT

A retainer for a floor mat positioned on a vehicle floor, where the floor mat includes at least one grommet. The retainer includes a body having a top edge and a bottom edge, a flange extending radially outwardly from the top edge of the body and a protruding member extending radially outwardly from an inner surface of the body, where the protruding member is between the top edge and the bottom edge of the body, and the body is removably attached to the at least one grommet by engaging the protruding member with the grommet.

6 Claims, 11 Drawing Sheets

FLOOR MAT WITH INTEGRAL GROMMET AND RETAINER

CROSS-REFERENCE TO RELATED APPLICATIONS

This application is a divisional of and claims priority to U.S. patent application Ser. No. 17/393,336 filed on Aug. 3, 2021, the entire contents of which is incorporated herein by reference.

BACKGROUND

The present invention relates generally to floor mats used for protecting underlying finished, unfinished floors or carpeting, and more specifically to floor mats used in passenger vehicles.

It is common to provide the floors of passenger vehicles with protective floor mats, used for protecting the original equipment carpeting from wear and dirt, and also for providing an easily removable protected surface for those vehicles having uncarpeted flooring. To prevent the mats from interfering with vehicle operation and to releasably secure them in position, various fastening techniques have been employed. One conventional floor mat fastening scheme is to secure vertical posts in the vehicle floor, either before or after the original equipment carpeting has been installed. The posts often have an irregular shape such as an enlarged head and narrow neck, or another shape for releasably and lockingly engaging a complementary grommet. The grommets are typically provided in multiple pieces, and are assembled on the mat by sandwiching the mat body between grommet components, about an opening in the mat which accommodates the post in the floor. Often the grommets define an opening that matingly and releasably engages the post, and in some cases includes a resilient or deformable portion for releasably locking the engagement between the post and grommet to more securely hold the mat in position in the vehicle. In other cases, the grommet opening has an irregular shape for releasably engaging a vertically-extending post formation.

In many cases, the grommet technology has become relatively complicated to assemble on the mat and costly to produce, requiring as many as five-to-six separate pieces, including the post assembly. Also, since many vehicle manufacturers specify the structure of the vendor-supplied grommets, grommet manufacturers are forced to create and maintain multiple tooling configurations for each vehicle manufacturer customer. Since the grommet manufacturer and the mat manufacturer are typically separate, there is also a requirement for coordination of the designs of the respective products by the separate vendors to meet vehicle manufacturer guidelines.

Thus, there is a need for an improved vehicle floor mat grommet configuration that is relatively simple in construction. There is also a need for an improved vehicle floor mat configuration that is readily adaptable to a variety of post attachment fastening technologies.

SUMMARY

The above-listed needs are met or exceeded by the present floor mat with an integral grommet. To facilitate insert molding and to promote bonding with the mat material, which is preferably a thermoplastic material suitable for injection molding, such as, Thermoplastic Elastomer (TPE) or other known thermoplastic materials, the present grommet is provided with a grommet body defining a post engagement throughbore, and a flange extending radially from the body. The grommet is made of a plastic material having a melting point greater than that of the surrounding mat so that it can withstand the insert molding process. In addition, the grommet is made of a plastic that is chemically compatible with the mat material so that they will bond together during the molding process.

In the preferred embodiment, the flange is located between upper and lower edges of the body. In addition, the flange is provided with at least one, and preferably a plurality of slots for enhancing the assimilation of the grommet into the TPE as the mat is formed and cooled. In the preferred embodiment, the flange has a radius approximately equal to a radius of the grommet body. Another feature of the present mat is that the region of the mat that engages the flange is vertically offset or stepped up from a mat base. Thus, upon engagement with the post in the vehicle floor, an upper margin of the post is generally flush with an upper margin of the stepped up region.

More specifically, a floor mat with integral grommet is provided for a vehicle having a floor with at least one upstanding post. The mat includes a core, an upper surface and an opposite lower surface, a grommet is integrally formed with the mat and contained between the upper surface and the lower surface. The grommet includes a grommet body having a first, upper edge and a second, lower edge, a post-engagement throughbore defined by the body. A flange extends radially outwardly from the body between the upper edge and the lower edge for engaging the mat core.

In another embodiment, a floor mat is provided for a vehicle having a floor with at least one upstanding post. The mat has a core, an upper surface and an opposite lower surface, and a grommet integrally formed with the mat and contained between the upper surface and the lower surface. Included in the grommet are a grommet body having a first, upper edge and a second, lower edge, a post engagement throughbore defined by the body, and a flange extending radially outwardly from the body approximately midway between the upper edge and the lower edge, the flange having a plurality of slots constructed and arranged for receiving material of the mat core for enhanced fastening of the grommet in the mat core.

In still another embodiment, a floor mat is provided for a vehicle having a floor with at least one upstanding post. The mat has a core, an upper surface and an opposite lower surface, and a grommet integrally formed with the mat and contained between the upper surface and the lower surface. Included in the grommet are a grommet body having a first, upper edge and a second, lower edge, a post engagement throughbore defined by the body, and a flange extending radially outwardly from the body between the upper edge and the lower edge. The mat includes a vertically offset portion engaging the flange, and an upper margin of the post is generally flush with an upper margin of the vertically offset portion.

In another embodiment, a floor mat for a vehicle having a floor is provided and includes a mat body having a core, an upper surface and an opposing lower surface. A grommet is integrally formed with the mat body and is contained between the upper surface and the lower surface of the mat body, where the grommet includes an outer surface having a protruding member. A retainer includes a body having an inner surface and a flange extending radially outwardly from the inner surface, where the inner surface includes a protruding member, such that the retainer is removably secured to the grommet by engaging the protruding member of the grommet with the protruding member of the retainer.

In a further embodiment, a floor mat for a vehicle having a floor is provided and includes a mat body having a core, an upper surface and an opposing lower surface. A grommet is integrally formed with the mat body and contained between the upper surface and the lower surface, where the grommet includes an outer surface having a protruding member. A retainer includes a body having an inner surface and a flange extending radially outwardly from the inner surface, where the inner surface includes a protruding member. A component is positioned on the lower surface of the mat body and is removably secured to the grommet by engaging the protruding member of the grommet with the protruding member of the retainer so that the retainer is against the component to hold the component on the lower surface of the mat body.

In another embodiment, a retainer for a floor mat positioned on a vehicle floor is provided where the floor mat includes at least one grommet, and the retainer includes a body having a top edge and a bottom edge, a flange extending radially outwardly from the top edge of the body and a protruding member extending radially outwardly from an inner surface of the body, where the protruding member is between the top edge and the bottom edge of the body, and where the body is removably attached to the at least one grommet by engaging the protruding member with the grommet.

DETAILED DESCRIPTION

Referring now to FIGS. 1-4, the present floor mat is generally designated 10, and is constructed and arranged for removable installation on a vehicle floor 12 having at least one post 14 secured thereto. Included on the post 14 is a flange 16 and a vertically projecting head 18 having an upper surface 20 and a diametrically narrowed neck 22. In some cases, the post 14 is secured to the vehicle floor 12 by chemical adhesive or the like applied to the flange 16. In other cases, the post is secured by a depending threaded spike portion (not shown) that threadably engages a hole in the vehicle floor 12. In most cases, the post 14 is made of durable plastic, however other self-supporting durable materials are contemplated, including but not limited to metals and engineered materials.

Figure 1:
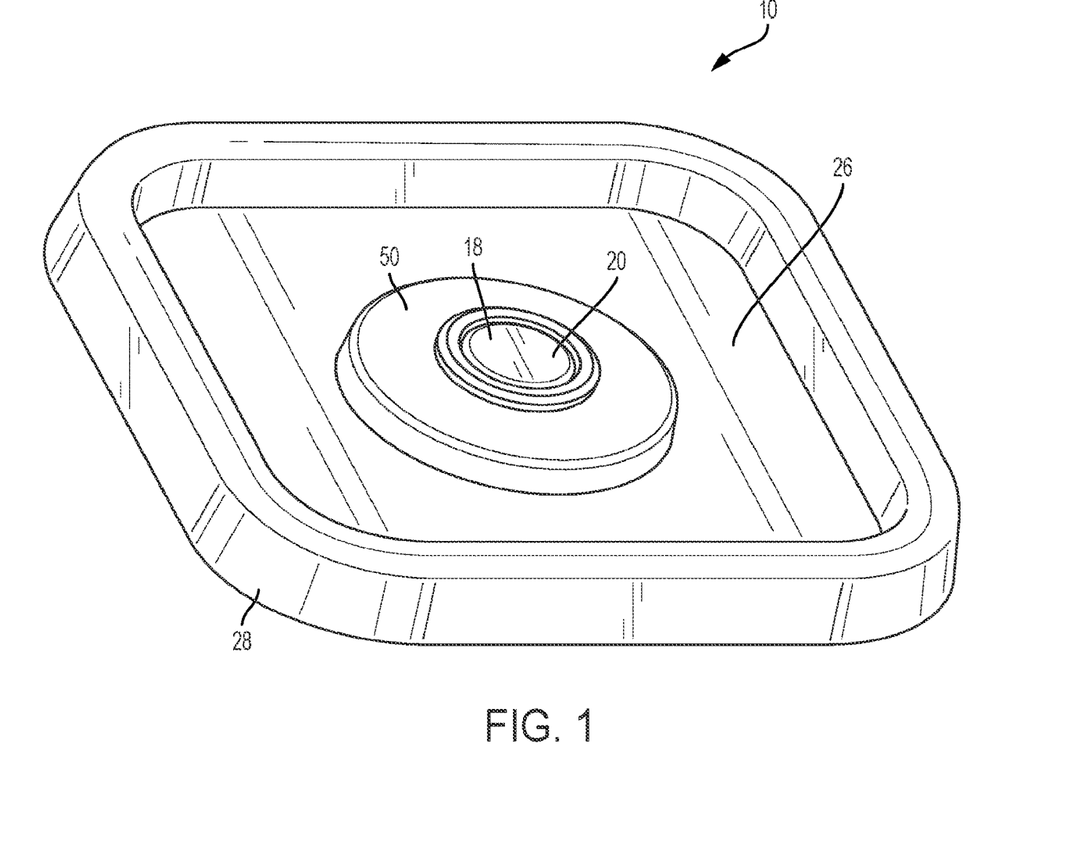
FIG. 1 is a top perspective view of a stylized or schematic floor mat equipped with the present grommet and engaged on a post in the vehicle floor.

It should be understood that the mat 10 as depicted in FIG. 1 is shown having a rectangular shape, however this is for illustration only, and as is well known in the art, floor mats for vehicles are dimensioned to fit the floor pan of particular vehicles and have a variety of shapes. Included on the mat 10 is a core 24, an upper surface 26 which is contacted by the feet of the driver and/or passengers of the vehicle, and an opposite lower surface 28 which contacts the vehicle floor 12. As described above, the mat 10 is preferably made of injection molded plastic, such as thermoplastic or thermoset materials which are well known in the art, and more preferably Thermoplastic Elastomer (TPE) using a variety of plastic materials as is well known in the art. Thermoplastic materials, and TPE's are selected for moldability, flexibility, color retention, appearance and durability, among other properties.

A main feature of the present mat 10 is the integral formation of a grommet, generally designated 30, which is integrated within the mat and also contained between the upper surface 26 and the lower surface 28. Included in the grommet is a grommet body 32, which in the preferred embodiment is generally cylindrical, however other shapes are contemplated, including polygonal. The body 32 has a first, upper edge 34, a second, opposite, lower edge 36, an outer surface 38 and an inner surface 40 defining a post-engagement throughbore 42. A flange 44 extends radially outwardly from the grommet body 32, more specifically from the outer surface 38. It is preferred that the flange 44 is disposed between the upper edge 34 and the lower edge 36, and more preferably approximately midway between the edges 34, 36.

An important purpose of the flange 44 is providing an anchor location for engaging the mat core 24, as the mat is molded around the grommet 30. As such, the grommet 30 is preferably made of a plastic material having a higher melting point than the material of the mat 10, such as TPE described above. Thus, the grommet 30 will withstand the injection of molten plastic during the molding process and will retain its structural integrity.

Figure 2:
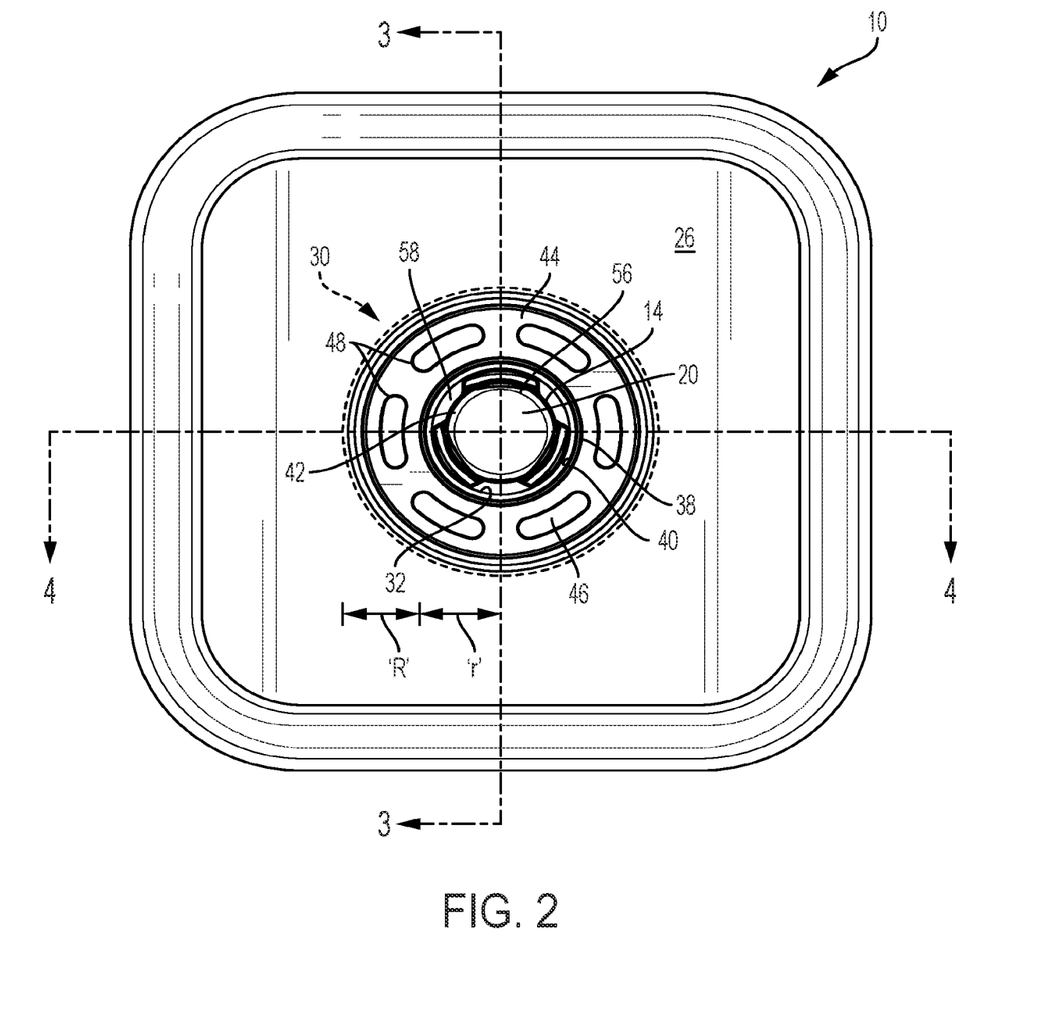
FIG. 2 is a top plan view of the mat of FIG. 1.
Figure 4:
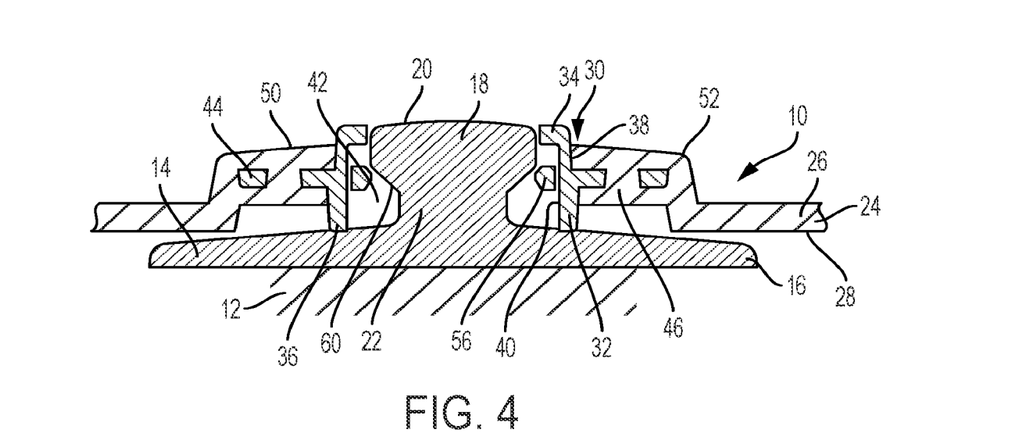
FIG. 4 is a vertical cross-section taken along the line 4-4 of FIG. 2 and in the direction generally indicated.

Referring now to FIGS. 2 and 4, a feature of the flange 44 is that it is provided with at least one, and preferably a plurality of slots 46. The slots 46 are open from top to bottom on the flange 44, and allow molten plastic that forms the mat 10 to flow through. Once the plastic sets and hardens, the flange 44, and the grommet 30 as well, are securely embedded and integrated into the core 24. As such, the slots 46 enhance the fastening of the grommet 30 to the mat core 24. As seen in FIG. 2, the slots 46 are preferably elongate in shape with radiused ends 48 generally forming an elongate oval shape, and are preferably arranged in end-to-end format on the flange 44. Portions of the flange 44 separate adjacent slots 46. Another feature of the flange 44 is that it has a radius "R" which is approximately equal to a radius "r" of the grommet body 32.

Figure 3:
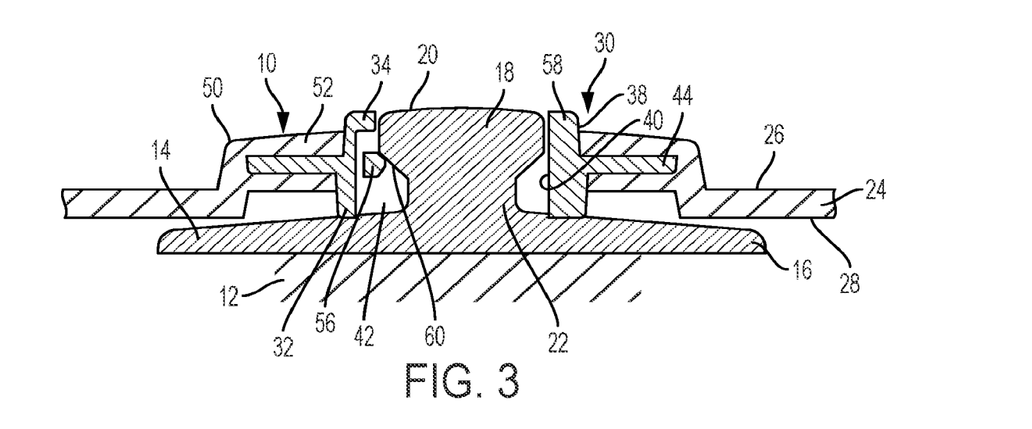
FIG. 3 is a vertical cross-section taken along the line 3-3 of FIG. 2 and in the direction generally indicated.

Referring now to FIGS. 1, 3 and 4, another feature of the present mat 10 is that it includes a vertically offset portion 50 that engages and contains the flange 44. The vertically offset portion 50 projects vertically from the upper surface 26 and surrounds the head 18 of the post 14. When viewed from above, as in FIGS. 1 and 2, the portion 50 is generally circular, however other shapes are contemplated. In the preferred embodiment, the vertically offset portion 50 has an upper margin or top surface 52 that is generally flush with the upper surface 20 of the post head 18.

Referring now to FIGS. 2-4, it is preferred that the present grommet 30 is provided with a structure on the inner surface 40, projecting in the post-engagement throughbore, for releasably lockingly engaging the post 14. This structure is contemplated as varying from manufacturer to manufacturer, to meet respective post specifications. In one embodiment, the grommet 30 includes at least one resilient, rib-like member 56, connected at respective ends to generally vertically-projecting blocks 58. As seen in FIGS. 3 and 4, the rib-like members 56 engage an underside 60 of the post head 18 for preventing inadvertent upward movement of the mat 10 relative to the post 14.

Referring now to FIGS. 5-10, another embodiment of the grommet for use with the present mat 10 is generally designated 70. Components shared with the grommet 30 are designated with identical reference numbers. Also, the grommet 70 is constructed and arranged for being integrally formed with the mat 10, in the same manner as the grommet 30 described above.

A main distinction between the grommets 30 and 70 is that the latter features a generally horizontally-oriented rib 72 defining an elongate oval opening 74. This structure replaces the rib-like member 56 and the blocks 58 of the grommet 30. Further, this configuration is constructed and arranged for releasably lockingly engaging a post 76 having an elongate, oval head portion 78 and a relatively small-diameter neck.

Figure 5:
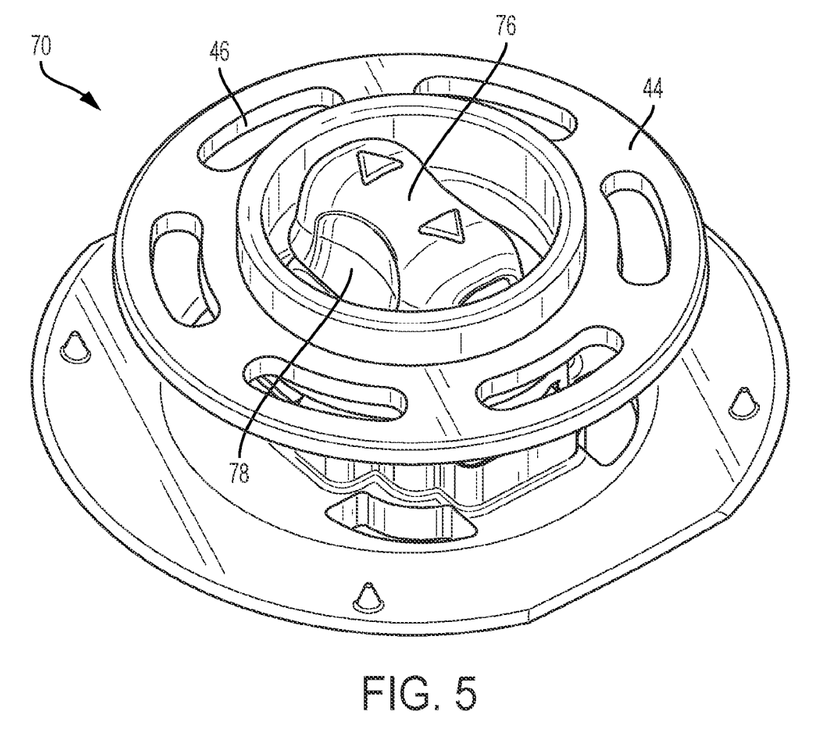
FIG. 5 is a top perspective of an alternate embodiment of the grommet assembly used with the present floor mat.
Figure 6:
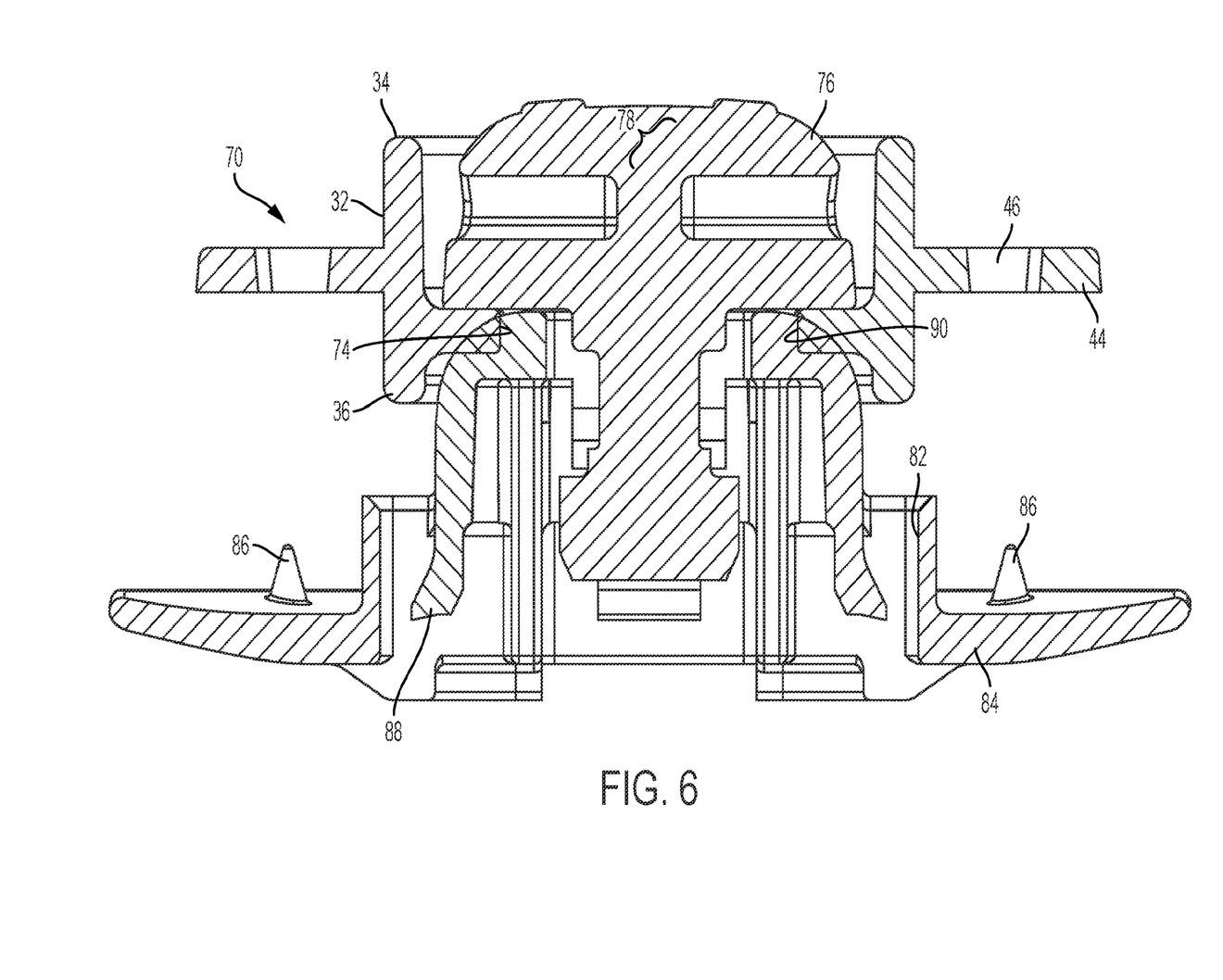
FIG. 6 is a cross-section taken along the lines 6-6 of FIG. 5 and in the direction generally indicated.
Figure 7:
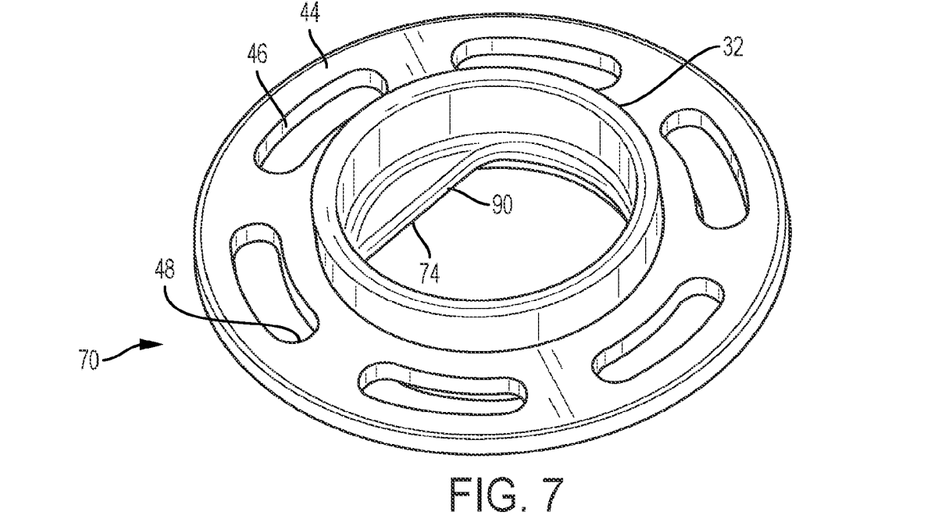
FIG. 7 is a top perspective view of the grommet used in the embodiment of FIG. 5.
Figure 8:
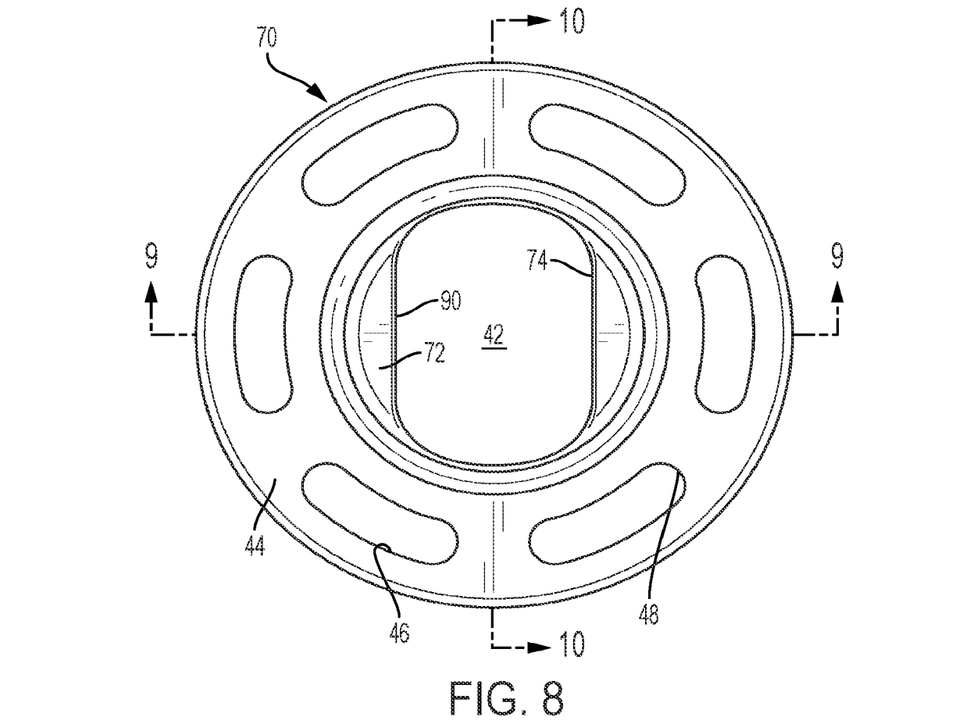
FIG. 8 is a top plan view of the grommet of FIG. 7.
Figure 9:
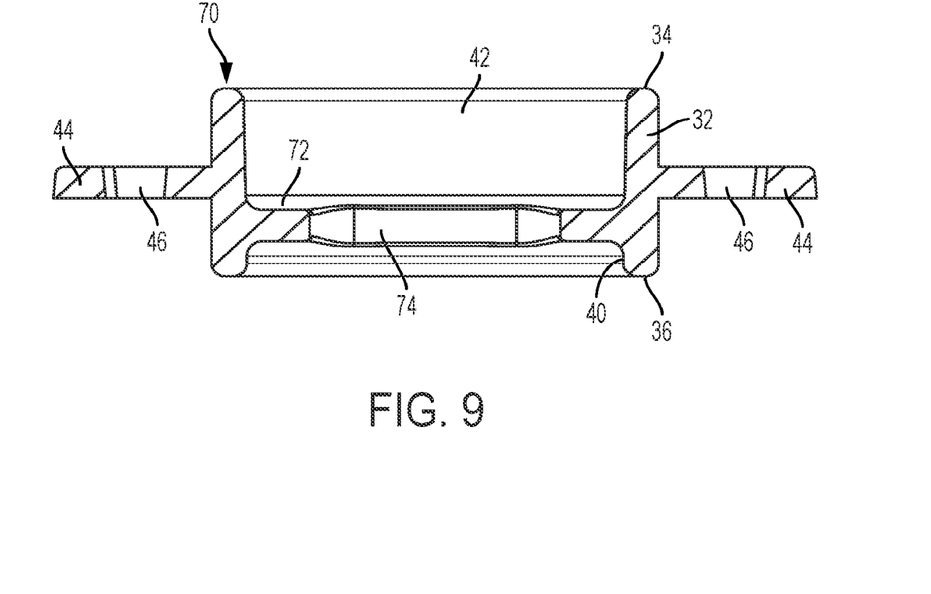
FIG. 9 is a cross-section taken along the line 9-9 of FIG. 8 and in the direction generally indicated.
Figure 10:
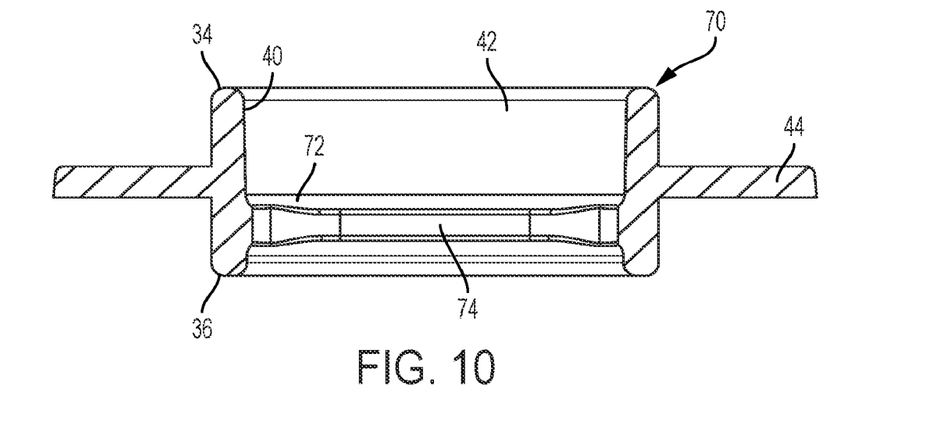
FIG. 10 is a cross-section taken along the line 10-10 of FIG. 8 and in the direction generally indicated.
Figure 11:
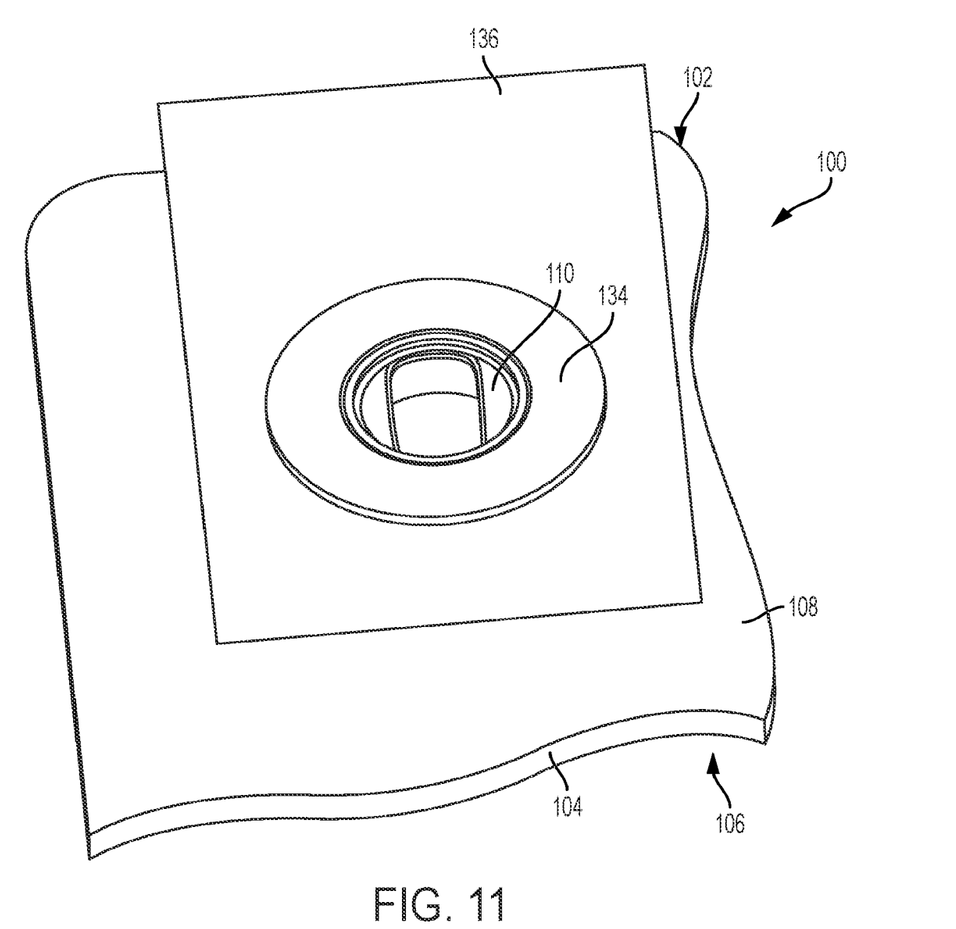
FIG. 11 is a perspective view of the present retainer attached to a grommet of a floor mat.

Referring now to FIGS. 5 and 6, the post 76 rotates axially relative to an anchor piece 82 with a radially-projecting disk 84 having barbs 86 projecting vertically for engaging carpeting of the vehicle (not shown). A clamp 88 having an inverted bowl shape is snap fit relative to the anchor piece 82 and retains the post 76 in position relative to the anchor, but allows rotation of the post. In this embodiment, once the post 76, the anchor piece 82 and the clamp 88 are assembled on the vehicle carpet, the user rotates the head 78 so that alignment with the opening 74 in the grommet 70 is achieved, allowing the grommet to be easily fit over the post. Then, the user rotates the head 78 approximately ¼ turn or 90° so that the grommet 70, and the mat 10 are securely held in place in the vehicle via engagement of the head with a narrow portion the oval opening 74. It is contemplated that the present grommet 30, 70 may be modified on the inner surface 40 to accommodate other manufacturer-specified post configurations.

Referring now to FIGS. 11-18, the present floor mat is generally designated 100, and is constructed and arranged for removable installation on a vehicle floor having at least one post as described above. Included on the mat 100 is a mat body 102 having a core 104, an upper surface 106 which is contacted by the feet of the driver and/or passengers of the vehicle, and an opposite lower surface 108 which contacts the vehicle floor. The mat 100 is preferably made of injection molded plastic, such as thermoplastic or thermoset materials which are well known in the art, and more preferably Thermoplastic Elastomer (TPE) using a variety of plastic materials as is well known in the art. Thermoplastic materials, and TPE's are selected for moldability, flexibility, color retention, appearance and durability, among other properties.

Figure 15:
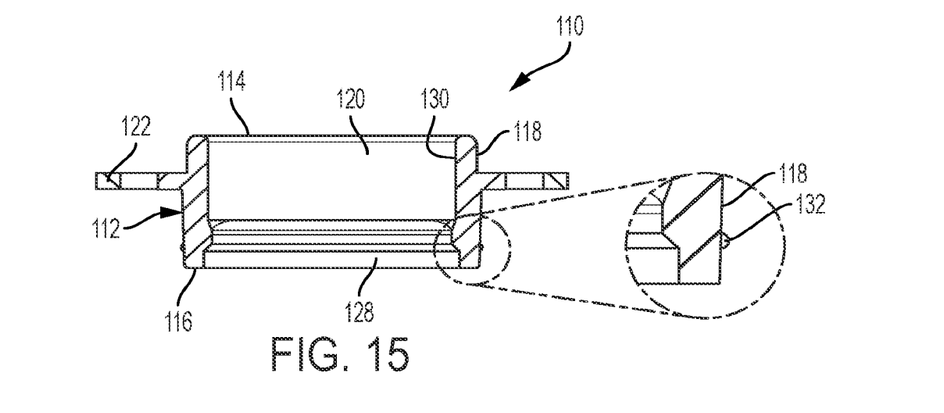
FIG. 15 is a cross-section of the grommet taken along the line 15-15 of FIG. 14 and in the direction generally indicated.

A grommet, generally designated 110, is integrated within the mat 100 and is also contained between the upper surface 106 and the lower surface 108 of the mat body 102. Included in the grommet 110 is a grommet body 112, which in the preferred embodiment is generally cylindrical, however other shapes are contemplated, including polygonal. The body 112 has a first, upper edge 114, a second, opposite, lower edge 116, an outer surface 118 and an inner surface 120. A flange 122 extends radially outwardly from the grommet body 112, more specifically from the outer surface 118. It is preferred that the flange 122 is disposed between the upper edge 114 and the lower edge 116, and more preferably closer to the upper edge as shown in FIGS. 12A and 15.

Figure 12A:
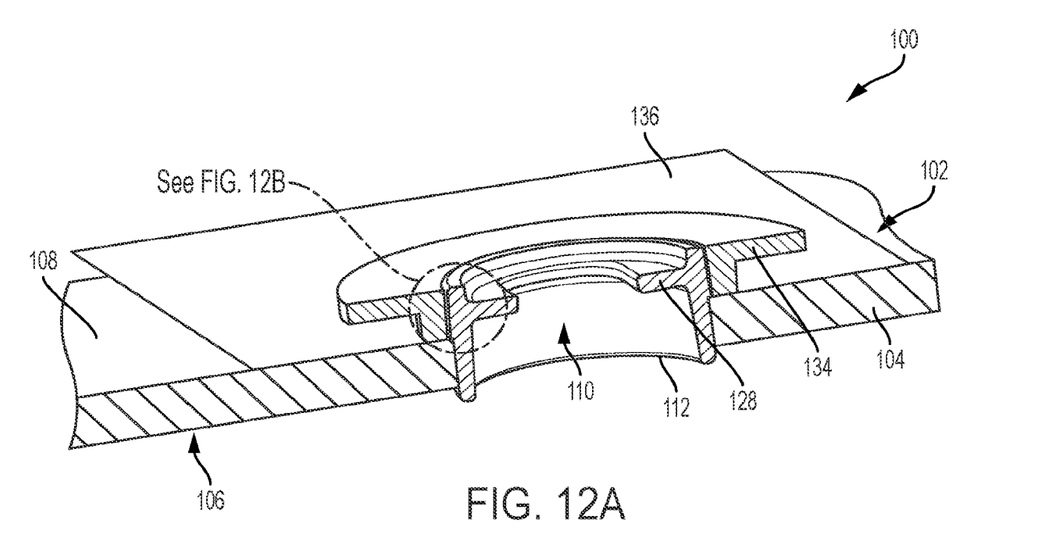
FIG. 12A is a fragmentary perspective view of the retainer of FIG. 11 attached to the grommet.

An important purpose of the flange 122 is providing an anchor location for engaging the mat core 104, as the mat 100 is molded around the grommet 110 as shown in FIG. 12A. As described above, the grommet 110 is preferably made of a plastic material having a higher melting point than the material of the mat 100, such as TPE described above. Thus, the grommet 110 will withstand the injection of molten plastic during the molding process and will retain its structural integrity.

Figure 14:
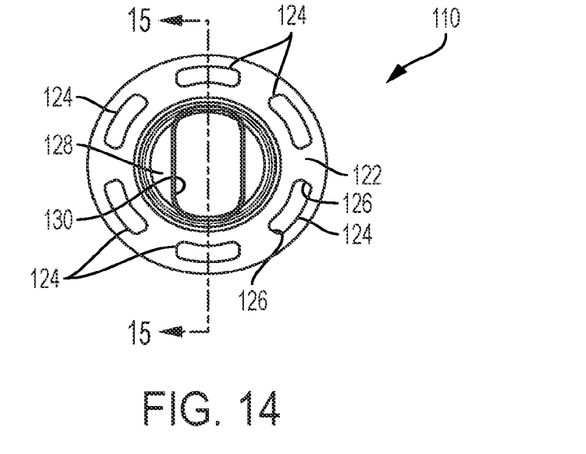
FIG. 14 is a top view of the grommet of FIG. 13.

Referring now to FIG. 14, a feature of the flange 122 is that it is provided with at least one, and preferably a plurality of slots 124. The slots 124 are open from top to bottom on the flange 122, and allow molten plastic that forms the mat 100 to flow through. Once the plastic sets and hardens, the flange 122, and the grommet 110 as well, are securely embedded and integrated into the core 104. As such, the slots 124 enhance the fastening of the grommet 110 to the mat core 104. As seen in FIG. 14, the slots 124 are preferably elongate in shape with radiused ends 126 generally forming an elongate oval shape, and are preferably spaced from each other on the flange 122. Portions of the flange 122 separate adjacent slots 124.

Referring to FIGS. 12A and 14, another feature of the grommet 110 is an inwardly projecting flange 128 that extends from an inner surface 120 of the grommet body 112. The flange 128 is located near the upper edge 114 of the grommet body 112 and defines a post-engagement throughbore 130. The through-bore 130 has an elongate shape and is configured to receive a post having a corresponding shape that is attached to or integrally molded on a vehicle floor for removably securing the mat 100 to the vehicle floor. It should be appreciated that the through-bore 130 may be any suitable shape that corresponds to a shape of the post.

As shown in FIG. 15, the grommet 110 includes a protruding member or rib 132 that extends radially outwardly from the outer surface 118 of the grommet body 112. In the illustrated embodiment, the protruding member 132 has a semi-circular cross-sectional shape but may have a square-cross sectional shape, a polygonal cross-sectional shape or any suitable cross-sectional shape. Also, the protruding member 132 extends continuously along the entire perimeter of the grommet body 112. In another embodiment, the protruding member 132 extends non-continuously along the perimeter of the grommet body 112. For example, the protruding member 132 may be formed in two spaced portions that are on opposing sides of the grommet body 112.

Figure 16:
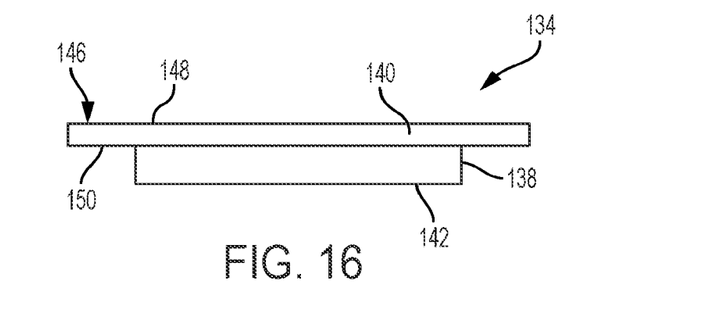
FIG. 16 is a side view of the retainer of FIG. 11.
Figure 17:
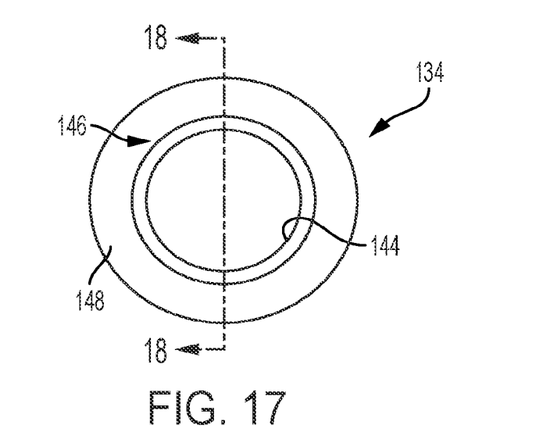
FIG. 17 is a top view of the retainer of FIG. 16.
Figure 18:
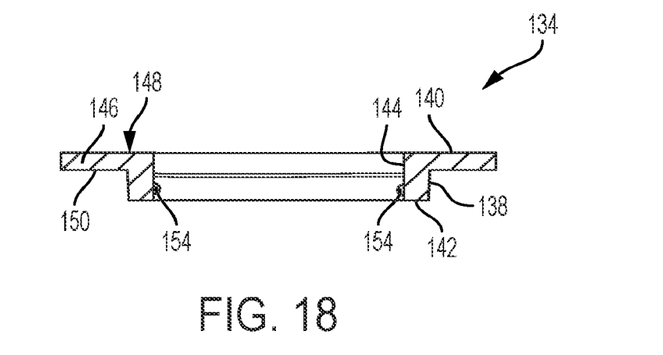
FIG. 18 is a cross-section of the retainer taken along the line 17-17 of FIG. 17 and in the direction generally indicated.

Referring to FIGS. 11 and 16-18, a retainer 134 is attached to the lower edge 116 of the grommet body 112 to secure a component 136 (FIGS. 11 and 12A), such as an information label, to a lower surface 108 of the floor mat. The retainer 134 includes a cylindrical body 138 having a top edge 140 and a bottom edge 142, and defines a through-bore 144 configured to receive the grommet body 112. As shown in FIG. 12A, the inner diameter of the body 138 of the retainer is greater than the outer diameter of the grommet body 112. In the illustrated embodiment, a flange 146 extends radially outwardly from the top edge 140 of the body 138 and has an upper surface 148 and a bottom surface 150. As shown in FIGS. 16 and 18, the diameter of the flange 146 is greater than the diameter of the body 138. In this way, when the retainer 134 is attached to the grommet body 112, the flange, and more specifically, the bottom surface 150 of the flange 146 engages the component to secure the component to the surface of the floor mat 100. It should be appreciated that the diameter of the flange 146 may be any suitable diameter that engages and secures the component 136 in place. Further, the thickness of the flange 146 is preferably 1.0 to 3.0 mm and the height of the body 138 (between the top edge and the bottom edge of the body) is 0.10 to 0.50 inches so that the profile of the retainer 134 on the surface of the floor mat 100 is substantially flat. In this embodiment, the retainer 134 is made of a durable material such as plastic or rubber, but may be made with any suitable material or combination of materials.

Figure 12B:
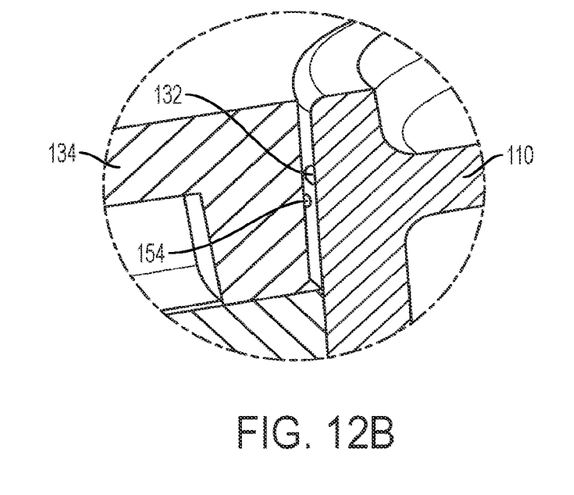
FIG. 12B is an enlarged fragmentary view of a portion of the retainer attached to the grommet of FIG. 12A.
Figure 13:
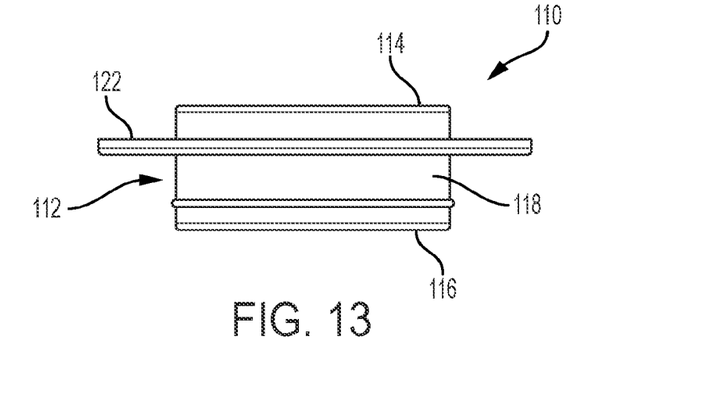
FIG. 13 is a side view of the grommet of FIG. 11.

As shown in FIG. 12B, the inner surface 152 of the body 138 includes a protruding member or rib 154, which has a semi-circular cross-sectional shape that is located between the top edge 140 and the bottom edge 142 of the body 138, where the protruding member 154 engages the protruding member 132 on the outer surface 118 of the grommet body 112 as described below to removably attach the retainer to the grommet. It should be appreciated that the protruding member 154 on the retainer 134 may have any suitable cross-sectional shape including a square-cross sectional shape or a polygonal cross-sectional shape. Further, in this embodiment, the protruding member 154 extends continuously along the entire perimeter of the inner surface 152 of the body 138. In another embodiment, the protruding member 154 extends non-continuously along the inner surface 152 of the body 138. For example, the protruding member may have two spaced portions, i.e., two spaced protruding members, on the inner surface 152 that are on opposing sides of the retainer 134 that engage the corresponding protruding member or protruding members 132 on the grommet body 112.

In use, a component 136, such as a label or informational tag, is placed on the lower surface 108 of the mat body 102 of the floor mat, where the component is adjacent to the grommet 112. The through-bore 130 of the retainer body 138 is aligned with the grommet body 112 and the retainer 134 is pressed onto the grommet body such that the inner surface 152 of the retainer slides along the outer surface 118 of the grommet body. The retainer 134 is secured to the grommet body 112 when the protruding member 154 on the inner surface 152 of the retainer body 138 engages and moves past the protruding member 132 on the outer surface 118 of the grommet body 112 as shown in FIG. 12B. In this way, the protruding member 132 on the grommet body 112 secures the retainer 134 to the grommet body. When the retainer 134 is secured to the grommet 110, the bottom edge 142 and the bottom surface 150 of the flange 146 engage the component 136 to secure the component to the lower surface 108 of the floor mat 100. The component 136 may be removed from the grommet 110 by pulling the retainer 134 away from the grommet so that the protruding member 154 of the retainer releases from and moves past the protruding member 132 on the grommet body 112. Another component 136 may then be secured to the floor mat 100 with the retainer as described above.

While a particular embodiment of the present floor mat with integral grommet and retainer has been described herein, it will be appreciated by those skilled in the art that changes and modifications may be made thereto without departing from the invention in its broader aspects and as set forth in the following claims.

The invention claimed is:

1. A retainer for a floor mat positioned on a vehicle floor, wherein the floor mat includes at least one grommet, the retainer comprising:
    a body having a top edge and a bottom edge, and a solid wall extending between the top edge and the bottom edge;
    a flange extending radially outwardly from the top edge of the body, wherein a diameter at the top edge of the body is greater than a diameter at the bottom edge of the body, wherein a portion of the wall extending from the flange to the bottom edge of the body has a uniform outside diameter; and
    a plurality of protruding members extending from an inner surface of the wall, said protruding members being on a common plane that is transverse to a longitudinal axis of the body, said protruding members being separated from each other and each protruding member being between the top edge and the bottom edge of the body, wherein an entire inner surface of each of said protruding members is in contact with the inner surface of the wall, and wherein said protruding members each have a semi-circular cross-sectional shape,
    wherein the body is configured to be removably attached to the at least one grommet by engaging the protruding members with the grommet.

2. The retainer of claim 1, wherein the flange has an outside diameter that is greater than an outside diameter of the portion of the wall from the flange to the bottom edge of the body.

3. The retainer of claim 1, wherein the body defines a through-bore configured to receive the at least one grommet.

4. The retainer of claim 1, wherein the flange of the retainer has a thickness of 1.0 to 3.0 mm.

5. The retainer of claim 1, wherein the body has a thickness of 0.10 to 0.50 inches.

6. The retainer of claim 1, wherein the protruding members extend non-continuously along the inner surface of the body.

* * * * *